United States Patent

[11] 3,613,891

| [72] | Inventor | Charles C. Cloutier<br>Morgan City, La. |
|---|---|---|
| [21] | Appl. No. | 22,170 |
| [22] | Filed | Mar. 24, 1970 |
| [45] | Patented | Oct. 19, 1971 |
| [73] | Assignee | Anti-Pollution Inc.<br>Morgan City, La. |

[54] OIL REMOVAL APPARATUS
36 Claims, 12 Drawing Figs.

[52] U.S. Cl. .................................................. 210/242,
210/526, 210/DIG. 21
[51] Int. Cl. ...................................................... B01d 17/02
[50] Field of Search ........................................... 61/1 F;
210/170, 242, 523, 526, DIG. 21

[56] References Cited
UNITED STATES PATENTS

| 2,378,798 | 6/1945 | Schneible ..................... | 210/526 |
| 2,682,151 | 6/1954 | Simpson et al. ............... | 61/1 F |
| 3,184,923 | 5/1965 | Galvaing ...................... | 210/242 X |
| 3,219,190 | 11/1965 | Thune ......................... | 210/242 |
| 3,237,774 | 3/1966 | Schuback ..................... | 210/242 |
| 3,268,081 | 8/1966 | Menkee et al. ................ | 210/242 |
| 3,403,098 | 9/1968 | Hirs ............................. | 210/40 |
| 2,378,798 | 6/1945 | Schneible ..................... | 210/526 |

Primary Examiner—Reuben Friedman
Assistant Examiner—Thomas G. Wyse
Attorney—Jones & Lockwood ABSTRACT: An apparatus for removing a layer of a floating liquid such as oil from the surface of a body of water is disclosed, comprising a flexible boom which confines the liquid so that it can be removed by a scoop unit. The scoop unit has a plurality of paddles which cooperate with a bottom plate to enclose and seal off a portion of the oil slick so that the oil and water in the sealed-off portion will separate in layers. The bottom plate has a plurality of apertures which permit the water and a small amount of the oil in the sealed-off portion to flow therethrough, the water flowing back into the body of water while the small amount of oil is trapped between the surface of the body of water and the bottom plate. This portion of trapped oil acts as a check valve to permit the water enclosed on subsequent passes of the paddles to pass through the holes in the bottom plate and to prevent the oil picked up on these subsequent passes from flowing through the apertures. After separation of the oil and water, the oil is carried by the paddles to a sump, for removal to a storage area.

PATENTED OCT 19 1971 3,613,891

INVENTOR
CHARLES C. CLOUTIER
BY Beale and Jones
ATTORNEYS

INVENTOR
CHARLES C. CLOUTIER

BY Beale and Jones
ATTORNEYS

OIL REMOVAL APPARATUS

BACKGROUND OF THE INVENTION

This invention relates to an apparatus for removing a layer of floating liquid such as oil and the like from the surface of bodies of water such as oceans, lakes, rivers etc.

One of the major causes of water pollution in recent years has been the ever-increasing amount of oil spillage caused by oil tankers which have run aground and broken apart, offshore oil well leaks, oil spillage during oil barge and tanker loading and unloading operations, and the like. Because of the size of present-day oil tankers and the increasing use of undersea oil wells, when such an event occurs, an oil slick of huge proportions is produced, which prevailing winds and tides usually disperse over a wide area, generally towards the shore. These oil slicks, it is now recognized, have many disastrous effects on the natural environment of the affected area so that all aquatic life is jeopardized. Further the shore lines in the area of the slick become coated with an oily film, depriving the public of the aesthetic beauty as well as the recreational use of the beaches, and producing irreparable harm as well as huge economic losses.

One of the most devastating results of an oil slick is its effect on water fowl such as sea gulls, ducks and the like, which depend on the water for their food and survival. When a slick covers the surface of the water, aquatic life such as fish, will not surface, thereby cutting off the major source of the sea gulls' food supply. Even when the fish do venture near the surface and the gulls dive into the slick, their feathers become coated with an oily film which makes it difficult if not impossible for the gull to fly, and many waterfowl may die from starvation or from drowning.

Other aquatic life such as oysters and clams are affected by oil slicks as well. After the surface oil layer becomes very thin, wind and wave action gradually emulsifies the oil, and small droplets of oil sink to the bottom. If an oil slick covers the water over oyster or clam beds, the oysters and clams take in the emulsified oil droplets in the water and become unfit for human consumption, if they do not die. Also, much of the undersea plant life depends for its existence on sunlight filtering through the water and on the oxygen which is captured by the surface action of the water, when the oil slick is dispersed over a wide area, sunlight and oxygen will not pass through the oil layer and thus two essential needs of the undersea plant life are eliminated.

Besides the foregoing and other effects on the natural environment, oil slicks usually damage surface craft and present a serious safety hazard by increasing the danger of fires. The danger of fire is increased, especially, imports and harbor facilities, as where an oil tanker is loading or unloading.

In the past, many methods and devices have been used in attempts to combat the menace of an extensive oil slick, but as yet, none have eliminated the above-mentioned and related problems. One method which has been used is the spreading of straw on the oil slick to absorb it. Although an improvement over many other schemes, this method has many disadvantages especially if the oil slick is in the ocean where it spreads over a wide area, for the large quantity of straw which is necessary to combat a large oil slick not only is prohibitive in itself, but the straw has to be disposed of after the job is completed. Furthermore, the straw will not confine the oil to a certain area, and the slick is still subject to being dispersed over a wide area by winds and tides.

Another method which has been used to reduce the damage caused by oil is the spreading of detergents to break up the oil slick, but it has been found that the detergents cause the oil to settle to the bottom of the body of water and kill the plantlife there. Also, some of the detergents have almost as much adverse effect of the undersea life as the oil slick itself. Additionally, the spreading of straw, detergents or like agents over the oil slick to absorb it or to break it up by dispersing the oil is, in the long run, an expensive method of handling the problem because it prevents recovery of the oil for later use. Thus, these methods have not proved very satisfactory and, although still in use, have merely provided a holding action until more suitable methods are devised.

Concurrently with the development and use of straw and detergents, many types of apparatus have been devised to remove the oil from the surface of water, with most of the present devices operating primarily as skimmers or separators. A skimmer apparatus uses a weir which permits the oil floating on the surface of the water to float over the weir and be collected in a receptacle Although this would seem to be a simple solution to the problem, several difficulties are encountered when using a skimmer device. For example, the skimmer has to be used in calm water because the weir must stay at a relatively constant level to be effective. This problem alone would prevent a skimming apparatus from being used in the open sea where there is usually wave action. HOwever, added difficulties appear in that for most skimmer units, the weir is either too high with respect to the oil layer-water interface, so that a thin layer of oil remains on the surface of the water, or the weir is too low so that water is mixed with the oil recovered. When it is considered that an oil slick may be less than 0.01 inches thick, the difficulties inherent in a skimmer device becomes apparent.

The separator type of apparatus, generally, takes both oil and water into a flotation tank and permits an oil layer to form on the surface of the water during a flotation period. After the flotation period, either a suction device or weir can be used to remove the oil layer so formed. The disadvantage of this type of arrangement is primarily one of time, for besides the time required for removing the oil layer from the flotation tank with a suction device or weir, time is also required for the flotation period. It can be seen that separator units alleviate one problem of skimmer units, in that they provide a calming chamber so that a weir will work more efficiently, but since separator units are so slow, they are not satisfactory when the oil slick is being produced by a heavy, constant flow, as from a blown-out oil well, a grounded oil tanker, and the like, where large amounts of oil are dispersed into the water in a very short period of time.

From the foregoing, it can be seen that there exists an urgent need for a method and apparatus which will overcome the disadvantages of the prior art and which will quickly, efficiently and economically clean up an oil slick by recovery of the spilled oil, rather than by spreading it further, or soaking it up, and thus compounding the loss. Such a device or method must be capable of use in shallow water, harbors, rivers and in the open sea, and must be easily transportable so that it can be taken to any oil spill. It must be effective to remove all the oil from the surface of the water, and be capable of preventing a slick from spreading out of reach of the recovery mechanism.

SUMMARY OF THE INVENTION

It is, therefore, an object of this invention to provide an apparatus which removes a floating liquid layer from the surface of a body of water.

Another object of this invention is to provide an oil recovery apparatus for removing an oil slick from the surface of a body of water, and which will be capable of removing virtually all of the oil not only in calm water, but in the open sea.

Still another object of this invention is to provide an oil spillage recovery apparatus which will pick up spilled oil, separate the oil from the water, and store the oil for use at a later time.

An additional object of this invention is to provide an oil spillage recovery apparatus which will pick up spilled oil from the surface of water by sealing a portion of the oil slick from the open body of water on which it is floating, thereby permitting the oil and water to separate thereafter removing the water but not the oil from the apparatus, and then storing the oil, the whole recovery operation being continuous.

Still another object of this invention is to provide an apparatus which will confine an oil slick to a particular area and which will remove the oil from the surface of the water.

A further object of this invention is to provide an oil recovery apparatus which will draw an oil slick toward an oil removal mechanism.

Still another object of this invention is to provide a lightweight, easily dismantled oil recovery apparatus which can be transported by airplane to any location where an oil slick might form so that the slick can be quickly and economically removed without a great amount of pollution or adverse effect on aquatic life.

These and other objects are accomplished by the present invention through the use of a floating boom, which confines a liquid layer such as an oil slick within a defined area, and a scoop unit which removes the layer of oil from the surface of the body of water.

The boom, which is secured to the scoop unit, encircles the oil slick and can be winched inwardly so that the encircling area can be made smaller, thereby drawing the oil layer into the scoop unit. The boom has an inflatable portion to provide buoyancy and a depending weighted skirt which prevents wave action of the body of water from allowing any oil to pass under the boom and escape.

The scoop unit, in one embodiment, has a pair of parallel pontoons, which are secured to an elongated sump which is in turn, secured to a towing barge. A conveyor is disposed between the portions, and when the oil layer is forced into the space between the pontoons by the inwardly moving boom, the conveyor removes the oil from the surface of the water. The conveyor includes forward and rear shafts which are secured to and located near opposite ends of the pontoons. The shafts extend across the space between the pontoons, with each shaft carrying two sprockets which are spaced inwardly from the sides of the pontoons. A pair of endless chains encircle corresponding sprockets on the forward and rear shafts to form an endless conveyor to which are secured a plurality of spaced paddles or blades which extend across the space between the pontoons. A bottom plate is secured at a slope between the pontoons and below the conveyor to form a channel through which the paddles move. The channel extends from the rear of the unit, where it is open to and below the surface of the body of water upwardly towards the sump at the forward end of the unit and above the water surface.

The paddles are moved along the path of the conveyor chains by a drive means secured to the forward shaft. The paddles move in such a way that they enter the oil slick at the rear of the scoop unit and are moved forward so that the edges of the paddles contact the channel defined by the bottom plate and the sides of the pontoons, sealing off a portion of surface oil and water between the paddle and the bottom plate, and allowing the water and oil to separate into layers. Continued motion of the paddles through the channel and along the bottom plate forces the sealed-off portion of oil and water upwardly along the sloped channel and over a plurality of apertures in the bottom plate which permit the water to drain out of the channel. As the first portion of sealed-off oil and water passes over the apertures, which are located above the surface of the body of water, a small portion of the oil will also flow through the holes and be trapped in a chamber formed between the surface of the water and the underside of the bottom plate. This small portion of oil acts as a check valve or filter by permitting the water in succeeding portions of oil and water sealed off by the paddles to pass through the holes and back into the body of water while preventing any of the oil to pass through the holes. As the paddles continue along the channel, following the path of the conveyor, they push the oil up the inclined surface of the bottom plate and deposit it in the sump at the forward end of the scoop unit. The oil is then removed from the sump by a suction pump and stored in tanks on the towing barge.

BRIEF DESCRIPTION OF THE DRAWINGS.

The foregoing and additional objects, features and advantages of the invention will be apparent to those skilled in the art from the following detailed description of a preferred embodiment, taken with the accompanying drawings, in which.

DESCRIPTION OF PREFERRED EMBODIMENTS

Figures 1, 2, 3, 4:
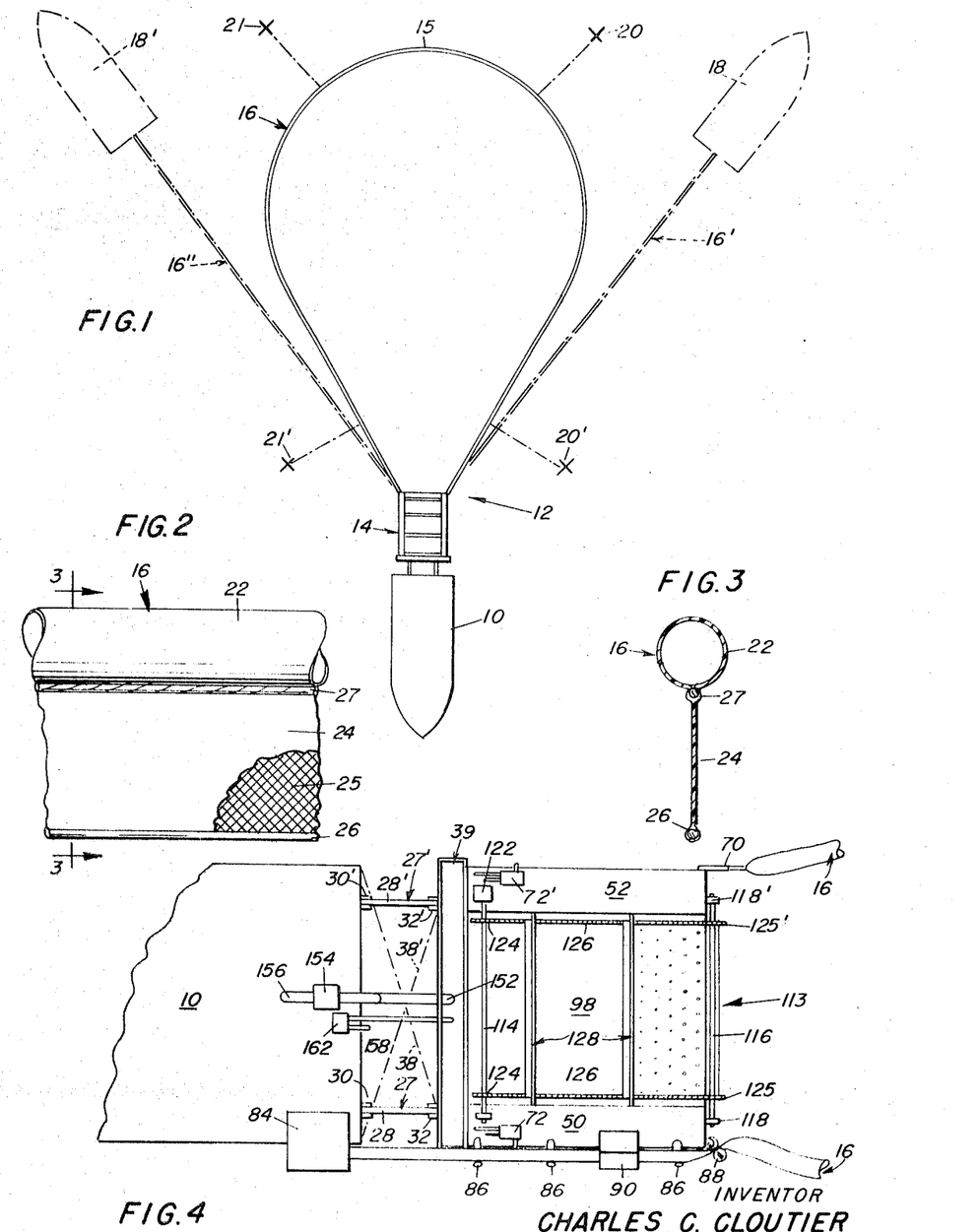
FIG. 1 is a general top plan view of an oil-removing apparatus having an inflatable boom and showing the relationship of the apparatus, boom and towing barge according to the present invention.
FIG. 2 is a side view of a portion of an inflatable boom suitable for use in the present invention.
FIG. 3 is a cross-sectional view of the inflatable boom as taken on line 3—3 of FIG. 2.
FIG. 4 is a detailed top plan view of the scoop unit according to the present invention showing the connection between the unit and the towing barge.

Referring more particularly to the drawings, in FIG. 1 the numeral 10 generally indicates a towing barge and the numeral 12 generally indicates a liquid removing apparatus for removing undesired surface layers from bodies of water, as contemplated in accordance with the present invention. Since the apparatus is particularly useful in the removal and recovery of oil and related products, the present invention will be described in terms of an oil recovery apparatus and method. Although the preferred embodiment illustrated here shows the liquid-removing apparatus 12 being towed by a barge 10, it will be apparent that the apparatus and barge can be combined into a single unit with the liquid-removing apparatus serving as the aft portion of the barge. The numeral 14 illustrates a scoop unit to which is secured a floating boom 16, the boom being extensible to encompass the liquid layer which is to be removed. The boom is designed to guide the surface layer towards the scoop unit which is then activated to remove this material from the water and deposit it in a suitable sump, from which it may be pumped into a suitable storage tank for recovery purposes.

There are several configurations and methods of utilizing the boom 16 to gather the surface layer, and where this layer is an oil slick the particular method used will generally depend on the type of source which is causing the oil slick or the area over which the oil slick is dispersed. For example, if the oil slick has not dispersed over too large an area and the cause of the oil spillage has been eliminated, the most appropriate way of using the boom may be to encircle the oil slick and confine it to a particular area. In this particular embodiment, when the oil slick is so confined to a particular area, one end of the boom can be fixedly secured to one side of the scoop unit and the other end of the boom may be attached to a take up or winching mechanism so that the boom may be moved inwardly, thereby causing the enclosed area to become smaller and forcing the oil into the scoop unit. On the other hand, if the slick is dispersed over a wide area, it may be more practical to divide the boom 16 into two parts, opening the closed circle at, e.g. point 15, and forming two booms, 16' and 16" each being fixed between one side of the scoop unit and corresponding pulling barges 18 and 18' as shown in phantom in FIG. 1. The pulling barges 18 can tow the scoop unit 14 and the barge 10 towards the slick so that the oil is forced into the scoop unit, or if the wind is blowing the oil slick towards barge 10, pulling barges 18 and 18' can be anchored, or the corresponding ends of the booms can be anchored, allowing the wind to force the oil into the scoop unit.

The method of use wherein the boom encircles the oil slick might also be used where there is a continuous flow from an oil source such as a leaking oil well or a sinking oil tanker. The boom 16 would then confine the source to a relatively small area so that it would not dissipate. The boom can be anchored as shown in phantom at numerals 20, 20', 21 and 21' in FIG. 1, thereby keeping the oil slick encircled and stationary until the source of spillage is eliminated. When using the boom in this anchored embodiment, a constant flow will force the oil layer into the scoop unit for removal. In addition, it has been found that during operation of the unit, a current is produced by the unit itself which also helps to draw the oil into the unit.

In order to permit use of a winch apparatus for taking up the boom 16, as mentioned above, the boom (see FIGS. 2 and 3) will preferably be made of a light, flexible material such as plastic which is substantially fire resistant and punctureproof and capable of being inflated and deflated. The boom can be similar to any of those disclosed in the prior art, but U.S. Pat. No. 2,682,151 to Simpson et al. shows a particularly suitable embodiment. The boom as disclosed in Simpson has two portions —an inflatable and deflatable hose, or tubular, portion 22 and a depending skirt portion 24 integral therewith. Preferably, the boom will be a unitary member with a steel mesh wire 25 formed integrally therewith to give it strength. A cable 26 may be carried at the lower edge of the depending skirt 24 and a cable 26' carried at the juncture between the hose portion 22 and the skirt portion 24. These cables serve as weights to hold the skirt down and to give the boom longitudinal strength so that it may be towed anchored and rolled up on a winch mechanism. The boom can be made in sections, if desired, for easy handling and this would be a preferable embodiment if the unit is used in the open sea, where the size of the unit and boom would have to be relatively larger than a unit which is to be used in calm water. The steel mesh embedded in the plastic of the boom is particularly necessary in a device designed for use in open or rough water, the mesh serving to distribute stresses caused by towing and anchoring the boom at spaced points. Also, the mesh protects the boom from being cut or otherwise damaged by contact with drilling rigs, ships, and the like, or by floating debris.

Since the oil recovery apparatus of the present invention is likely to be used in relatively rough water, it is necessary that the scoop unit 14 be secured to the towing barge 10 (see FIGS. 4 and 5) so that it can move vertically in the water with respect to the barge. Therefore, in this preferred embodiment the scoop unit is secured to the barge 10 by two spaced attachment assemblies 27 and 27' made of any suitable material such as steel, aluminum, etc. The attachment assemblies include bars 28 and 28' disposed between corresponding spaced vertically oriented clevices 30 and 30' secured to the rear of barge 10 and clevices 32 and 32' secured to the forward end of scoop unit 14. Pins or nut and bolt assemblies 36 extend through each of the clevices and corresponding holes (not shown) in the end of each of the bars 28 and 28' so that the bars will pivot within the devices and the scoop unit can move vertically in the water with respect to the barge. The spaced position of the attachment assemblies 27 and 27' prevent the scoop unit from moving laterally or from turning with respect to the barge. Steel cables 38 and 38' extend from the front of the scoop unit 14 to the rear of the barge 10 and help to stabilize and prevent side-to-side movement of the scoop unit. The cables 38 and 38' can be secured to the scoop unit and the barge in any suitable manner.

In this preferred embodiment, the scoop unit 14 (see FIGS. 4, 5 6 and 7) includes an elongated sump 39 having a front side 40, rear side 42, ends 44 and 46 and a bottom 48, the sump being designed to receive the oil recovered by the scoop unit. The unit is supported in the water by two hollow rectangular pontoons 50 and 52 which are secured by any suitable means to the rear side 42 of the sump 39. The sump and pontoons can be made of any lightweight, durable material such as aluminum, fiberglass or the like. One end of each of the pontoons is closed while the other end is open, the open end of each pontoon being secured to the sump 39 as by outwardly extending side flanges 54 and 56 and bottom flange 58 on pontoon 50 and outwardly extending side flanges 60 and 62 and bottom flange 64 on pontoon 52. These flanges are formed integrally with the respective side and bottom walls of the open end of the pontoons and are secured to the rear wall of the sump 39 by a plurality of fasteners 66 such as nuts and bolts extending through corresponding holes (not shown) in the rear wall of the sump and the flanges on the pontoons. A suitable water sealant, such as the pontoons gasket or the like can be used between the flanges of the pontoons and the sump walls to insure that the pontoons are watertight below the water line. The upper edge of the pontoons need not be secured to the sump since they will not normally be in contact with the water, but a gasket sealant or the like can be used, if desired, to make the joint watertight. The pontoons extend rearwardly from the sump and are in a spaced, parallel relationship. One of the pontoons, for example 52, is provided at its closed end 68 with a bracket 70, to which boom 16 may be releasably fastened by means of a suitable clamp or the like.

The scoop unit can be raised or lowered in the water by flooding the pontoons with water by any suitable ballasting means, such as pumping units 72 and 72' secured to the top of pontoons 50 and 52, respectively. The pumping units 72 and 72' have inlet-outlet lines 74 and 74', respectively, connected thereto which extend down the side of the pontoons into the body of water. The pumping units can be operated to flood the pontoons through conduits 76, 76' and 80 and 80' which extend into the pontoons. The pontoons 50 and 52 are divided into fore-and-aft compartments by means of vertical watertight bulkheads 78 and 78', respectively, which are secured inside the pontoons approximately at the midpoint of the pontoons. Conduits 76 and 76' extend into the rear compartments of their respective pontoons, and thus extend through the tops of the pontoons, through their forward compartments, and through bulkheads 78, 78', respectively. Conduits 80 and 80' terminate in the forward ends of their corresponding pontoons. The pumping units 72 and 72' thus are able to ballast and deballast different portions of the pontoons so that the scoop unit may be properly positioned in the water.

A winch mechanism 84 (see FIG. 4) is located on the towing barge 10 and has one end of the boom 16 secured thereto, whereby the boom may be wound around the winch mechanism reel in a deflated posture. A plurality of inclined rollers 86 located on the outer edge of the top of pontoon 50 and secured thereto in any appropriate manner hold the deflated boom out of the water as it is pulled from the rear of the pontoon to the winding mechanism 84. The boom is taken up out of the water and deflated at the rear of the pontoon 50 by a pair of hydraulically driven pickup rollers 88, and is passed through a cleaning unit 90 which cleans the boom and discharges the residue back into the space between the pontoons 50 and 52 by a chute 92. The cleaner unit 90 may use any appropriate method such as high-pressure water, steam or the like for cleaning the boom.

Figure 5:
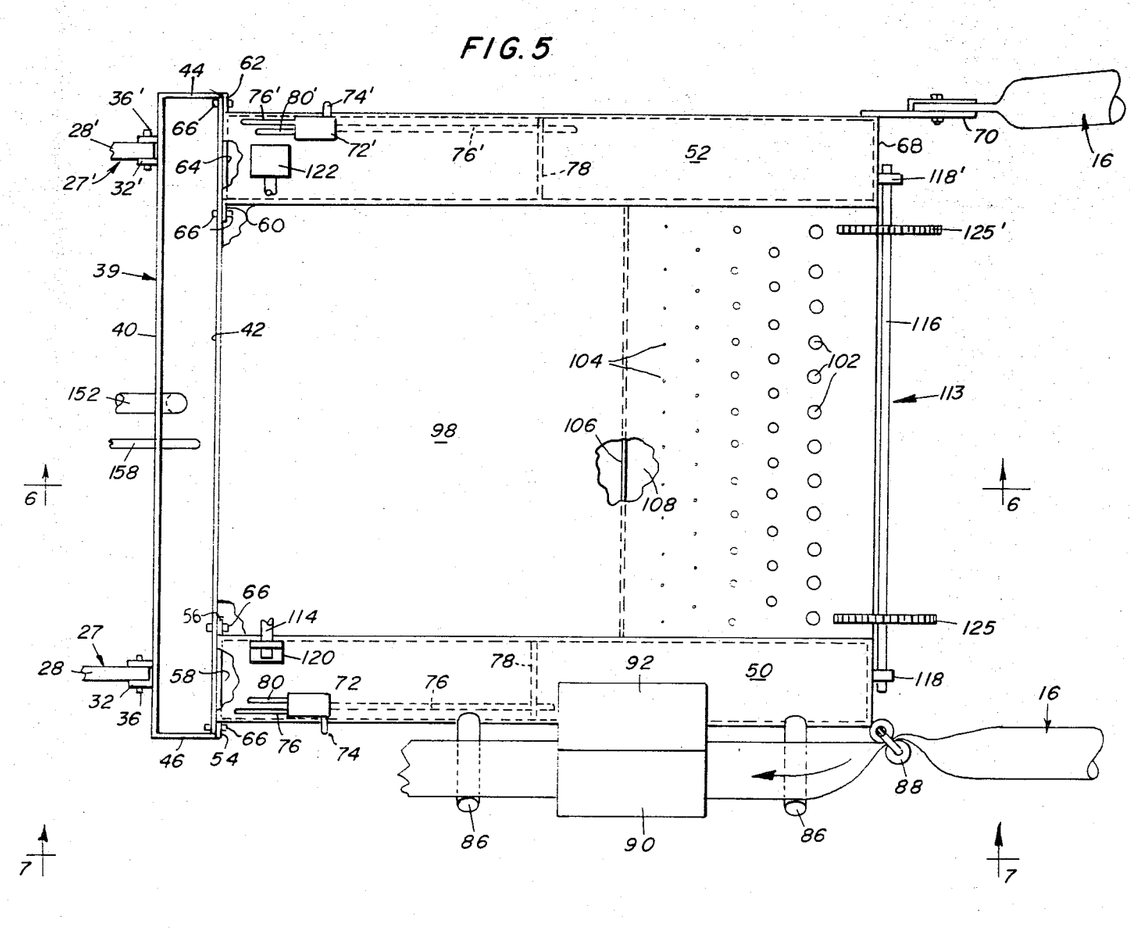
FIG. 5 is an enlarged detailed top plan view of the scoop unit according to the present invention with the paddle-carrying conveyor removed.
Figure 6:
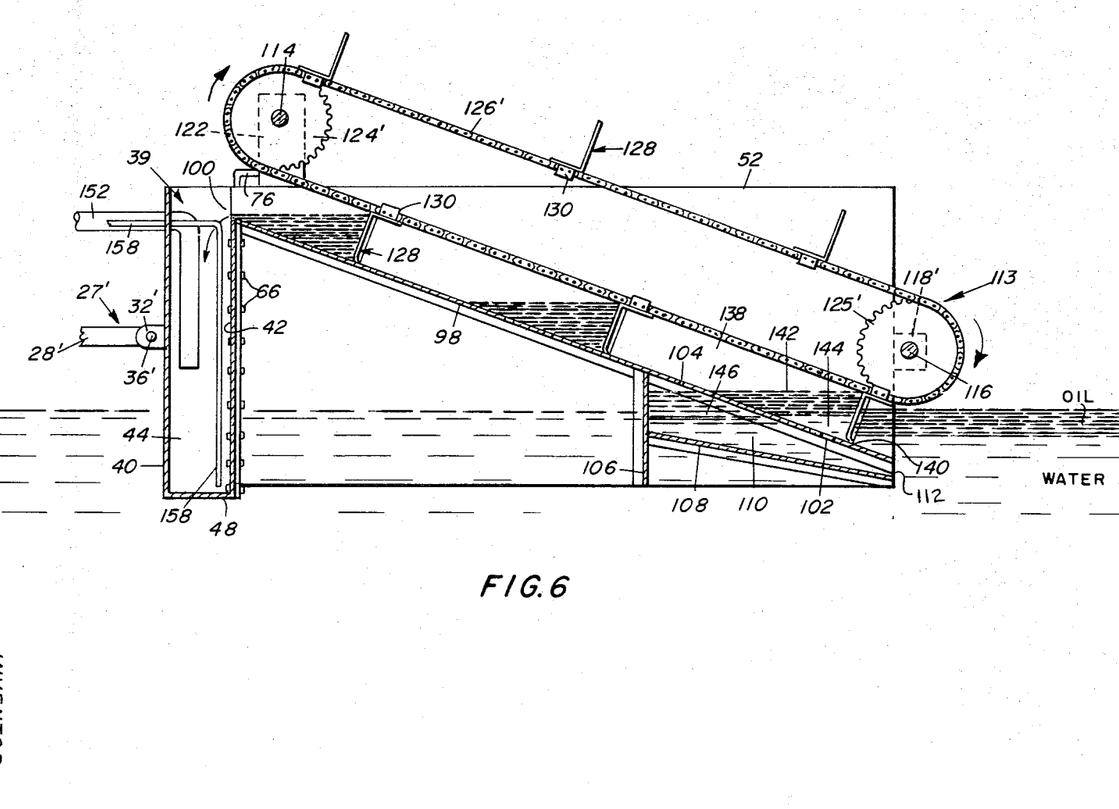
FIG. 6 is a cross-sectional view of a scoop apparatus constructed in accordance with the present invention, taken on line 6—6 of FIG. 5.
Figure 7:
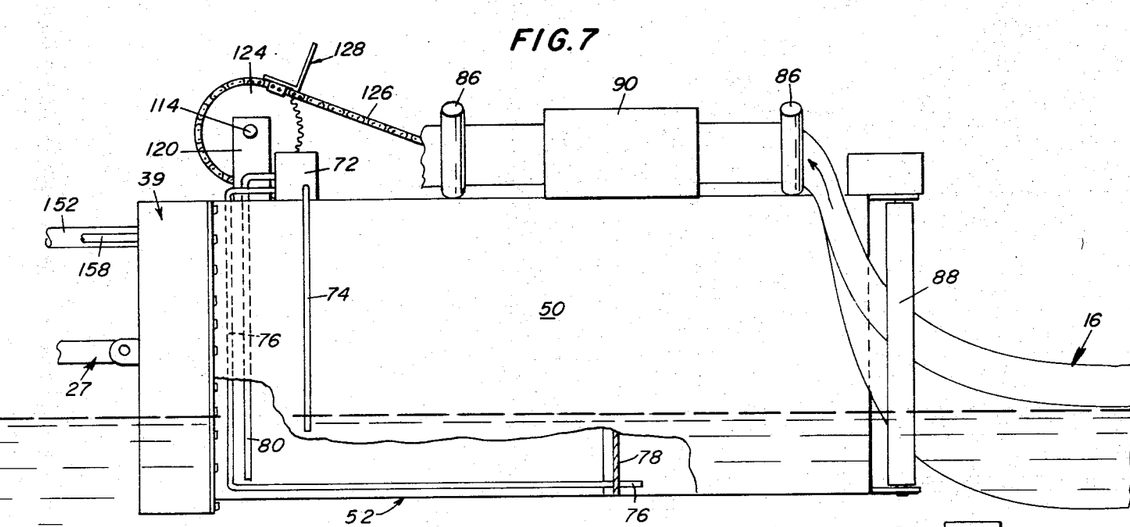
FIG. 7 is a side view of the scoop unit according to the present invention, taken on line 7—7 of FIG. 5.

In FIGS. 5 and 6, the numeral 98 illustrates a bottom plate which is secured between pontoons 50 and 52. The bottom plate 98 extends from the rear of the pontoons and is inclined upwardly to a cutout 100 in the upper portion of rear wall 42 of sump 39. The cutout portion extends across the rear wall 42 from the inside wall of pontoon 50 to the inside wall of pontoon 52 and is connected to the bottom plate across its width. The bottom plate 98 includes a plurality of holes or apertures 102 arranged in a pattern which extends across the width of the plate and along a portion of its length. The apertures are near the rear of the plate, but preferably far enough forward so that in normal use of the scoop unit all of the holes will be above the surface of the water. In a preferred arrangement, the apertures extend across the bottom plate 98 in rows, with relatively large holes 102 being near the rear of the unit and progressively smaller holes being used for the rows nearer the forward end of the unit. The last row of apertures would then consist of the smallest holes 104. The exact size, spacing and number of apertures will be dependent upon the size of the oil recovery unit, its desired speed of operation, and related factors.

A vertical bulkhead 106 extending between the pontoons and extending downwardly into the water is secured to the lower surface of bottom plate 98 slightly forward of the last row of small holes 104. An inclined plate 108 (see FIG. 6) located below bottom plate 98 and also extending between pontoons 50 and 52 is secured to the vertical bulkhead 106 and to the sides of the pontoons. The bulkheads 106, 108 form a detention chamber 110 beneath the bottom plate 98 which has an outlet 112 at the rear of the scoop unit. This chamber receives water flowing from the top of plate 98 through apertures 102, 104 to separate the water from the oil picked up by the scoop unit as will be explained.

A conveyor mechanism generally indicated at 113 (see FIGS. 4 and 6) is disposed above and cooperates with the bottom plate 98 to remove the oil layer from the surface of the water. In this embodiment, the conveyor includes a forward shaft 114, which is positioned above the pontoons and across the space between them near the sump 39, and a rear shaft 116 carried on the rear ends of the pontoons 52 and 50, respectively. The rear shaft is positioned lower than but parallel to the forward shaft, and is journaled in bearing housings 118 and 118' which are secured, as by suitable bolts, to the rear ends of pontoons 50 and 52, respectively. One end of the forward shaft 114 is supported by and journaled in a bearing housing 120 which is preferably bolted to the top of pontoon 50, while the other end of the shaft 114 is supported by and coupled to a suitable drive mechanism 122 secured to the top of pontoon 52. Each of the shafts 114 and 116 carry a pair of sprockets 124, 124' and 125, 125', respectively, each sprocket being spaced inwardly from the sidewalls of the pontoons, with the sprockets 124 and 124' on shaft 114 being aligned with the sprockets 125 and 125' on shaft 116. If desired, additional sprockets can be distributed across the shaft. An endless chain 126 encircles sprocket 124 on the forward shaft and corresponding sprocket 125 on the rear shaft while an endless chain 126' encircles sprocket 124' on shaft 114 and 125' on shaft 116. A plurality of elongated paddles or blades 128 are carried by and secured to chains 126 and 126' by brackets 130 or any other suitable means. The paddles or blades are spaced around the path defined by the periphery of the chains at approximately equal distances apart. The chains are rotated in a clockwise direction, as viewed in FIG. 6, by shaft 114, driven by motor 122 which may be a variable-speed hydraulic motor, for example. The paddles 128 sequentially enter the water at the rear of the scoop unit as the chains are driven, and are pulled forward and upward along the inclined bottom plate of the scoop unit, as shown in FIG. 6.

Figure 8:
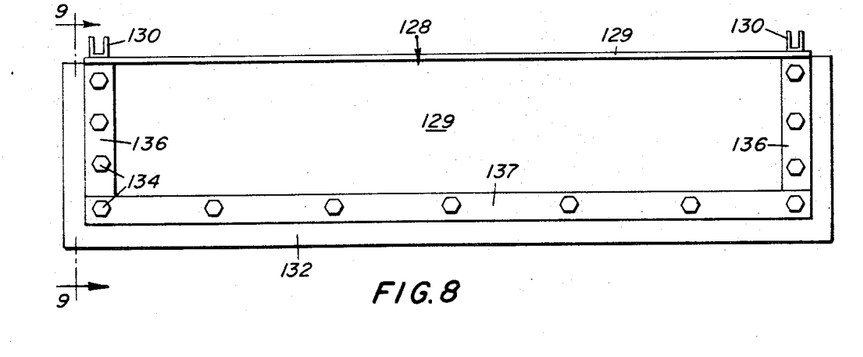
FIG. 8 is a plan view of a conveyor paddle used on the scoop apparatus of the present invention.
Figure 9:
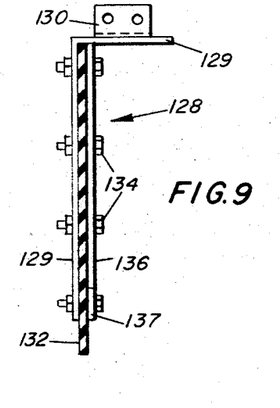
FIG. 9 is a cross-sectional view of the elongated conveyor paddle of the present invention, taken on line 9—9 of FIG. 8.

Turning now to FIGS. 8 and 9, it will be seen that paddles 128 preferably are formed with a rigid portion 129, which can be made of a standard angle bracket of aluminum or any other suitable material, and a flexible rim 132 which extends along the sides and bottom edges of the rigid portion 129. The flexible rim 132 can be made of any suitable material such as rubber, plastic or the like and, in the illustrated form, is secured to the side and bottom edges of the rigid portion 129. The rim may be fastened in place by a plurality of nut and bolt assemblies 134 extending through coinciding holes (not shown) in the edges of rigid portion 129 and flexible rim 132. Side and bottom backing strips 136 and 137 are provided along the edges of the rigid portion 129 to serve as clamps for the flexible rim, the nut and bolt assemblies also passing through appropriate holes in the backing strips to secure the flexible rim to the paddle.

As mentioned above, the paddles 128 enter the oil slick and the water at the rear of the scoop unit and are pulled forward onto the base plate 98. The paddles are so dimensioned that the side edges of the flexible rim 132 contacts the inside walls of the pontoons 50 and 52 and the bottom edge of rim 132 contacts the bottom plate 98, initially touching at a point 140 near the rear end of the scoop unit. This produces a calming or separation chamber 138 within the channel formed by the pontoons and bottom plate which is sealed off from the open water by the paddle 128. The paddle 128 forces the sealed-off portion of the oil and water up the inclined bottom plate 98 towards the sump 39. In order to keep the flexible rim 132 of the paddle 128 in contact with the bottom plate 98, the space between the periphery of the chains 126 and 126' and the top surface of the bottom plate must remain approximately constant. This is accomplished by positioning the forward shaft 114 and rear shaft 116 so that the peripheral edge of their sprockets are a constant distance from the bottom plate 98.

OPERATION

Turning now to the operation of the scoop apparatus, the unit is placed in a body of water adjacent an oil slick, and the pontoons are partially filled with water to lower the device to its operational position. The rear of the scoop unit is lowered until the rearward edge of bottom plate 98 is submerged below the surface of the water, shown at the interface between the oil slick 142 and the body of water 144. The rear edge of the plate is submerged so that water and oil flow into the channel defined by pontoons 50 and 52 and plate 98, with the surface of the water approaching the first row of the apertures 102. The drive mechanism is energized and the paddles 128 (see FIG. 6) enter the oil slick at the rear of the scoop unit and are pulled forward, eventually contacting the bottom plate 98 at contact point 140 to seal off a portion of oil and water from the body of water. The calming chamber 138 formed thereby permits the oil 142 and water 144 to separate into layers as the paddles continue to move, so that as the oil and water are pushed up the inclined bottom plate 98 by paddle 128, the water, which will be below the oil (as shown), will flow out of the calming chamber through the holes 102, 104 in the bottom plate. When the scoop unit is activated during the initial pass of the first paddle, a small portion of oil flows through the apertures with the water and is trapped or captured at 146 in the chamber 110 between the lower surface of bottom plate 98 and the surface of the body of water. The amount of oil trapped in this chamber will depend upon the position of the scoop unit in the water. This entrapped oil forms a filter, or check valve, for the apertures 102, 104 during succeeding passes of the paddles 128. As a succeeding paddle enters the oil slick and separates a portion of the oil and water from the rest of the body of water, the oil and water separate in the calming chamber 138. When this batch of oil and water is pushed up the inclined plate by the paddle, the water passes through the holes in the bottom plate, and through the trapped oil 146. This water will flow through the bed of oil 146 and will pass out through the chamber outlet 112. On the other hand, the trapped oil will not permit the layer of oil 142 to pass through the holes; therefore, the remaining oil 142 is carried up the inclined plate and dumped into sump 39, from which the oil can be removed by means of suitable pumps (not shown). When the entire oil slick has been removed, the entrapped oil 146 can be forced up through the holes in the bottom plate by lowering the scoop unit into the water, and be carried to the sump, thereby permitting all the oil to be removed from the surface of the body of water.

The amount of water which is passed through the apertures 102 can be regulated in two ways. One way would be to vary the depth of the scoop unit in the water by using the ballasting means described above so that the number of holes in can bottom member which are above the surface of the water is increased and decreased. A second means of increasing or decreasing the amount of water which flows through the holes in the bottom plate is to vary the speed at which the paddles 128 are pulled up the inclined plate by varying the speed of the variable-speed hydraulic motor 122. This latter method would vary the amount of time that the water in chamber 138 is exposed to the holes, and the longer the time, the more water will flow through the holes, and vice versa.

During the operation of the scoop unit, the oil is dumped into the sump 39, and from there is carried by way of conduit 152, pump 154, and discharge line 156 to suitable storage tanks on the barge, as shown in FIG. 4, so that the oil recovered can be saved for later use. In the event that some water gets into the sump 39, it will sink to the bottom, where it can be removed by another conduit 158, which extends into the lower region of the sump, and a suction pump 162 which is located on the barge or other convenient location. It will be apparent that other means for removing the oil and water from the sump may be employed.

Figure 10:
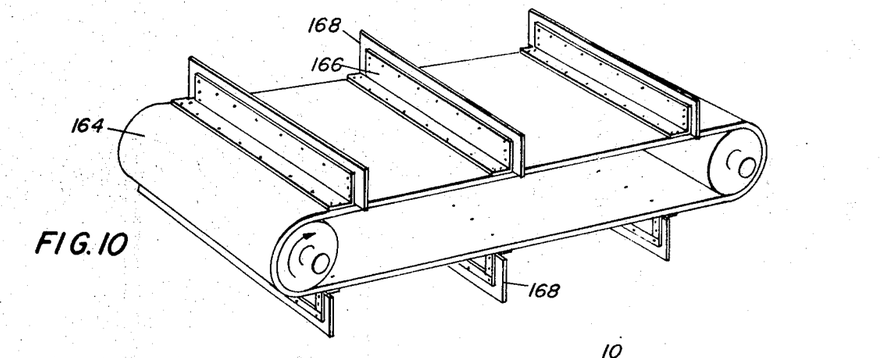
FIG. 10 is a perspective view showing a modified conveyor.

FIG. 10 shows a modification of the preferred embodiment of the present invention, and illustrates a continuous molded belt 164 having a plurality of scoops or paddles 166 integrally molded therewith or otherwise suitably fastened thereto. The molded belt 164 is designed for use in place of the endless chains 126 and 126' and the individual paddles 128. The scoops or paddles 166 each have a flexible rim 168 which serves the same purpose as the flexible rim 132 on the individual scoops 128; i.e. to provide a means for sealing off the calming chamber 138 from the open water on which the oil slick is floating. If desired, rollers can be used in place of the sprockets 124, 124', 125 and 125'. An advantage of using the continuous belt 164 is that it will provide a completely closed calming chamber 138 because the belt will form a top for this chamber. In the embodiment utilizing endless chains mounted on sprockets, the top of the calming chamber 138 would be open, whereby high waves washing over the tops of the paddles would prevent proper layering of the oil and water, and thus reduce the effectiveness of the invention. Thus, in some situations the continuous belt conveyor might be the preferred form of the invention.

Figure 11:
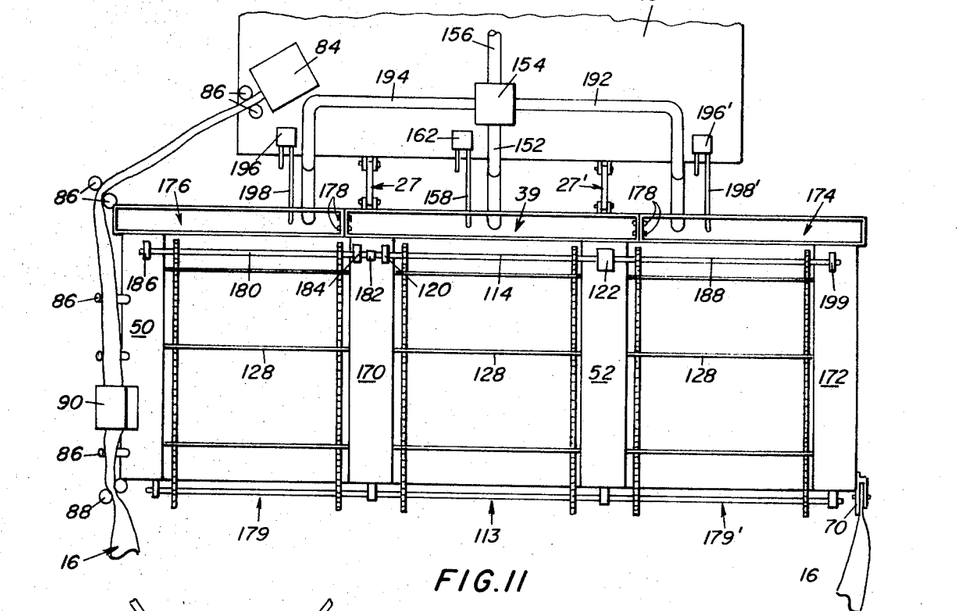
FIG. 11 is a top plan view of a modified oil-removing apparatus having a plurality of scoop units connected adjacent to one another, constructed in accordance with the present invention.

The scoop unit can be used in the single-unit configuration shown in FIG. 4 or it can be expanded to utilize a plurality of conveyors, as shown in FIG. 11. The design of the present device facilitates such expansion, which provides a much greater oil-handling capacity, for in order to and other conveyors to the initial single unit 14, it is only necessary to attach two additional pontoons 170, 172 and a pair of sumps 174 and 176 to the center sump 39 by any suitable means such as nut and bolt assemblies 178. The pontoon 50 preferably would be removed from sump 39 and is secured to the outside end of sump 176 so that it is the outermost pontoon, whereby only one pontoon is required to have the mountings for the cleaning unit 90 and rollers 86 and 88. Pontoon 170 is secured to sump 39 in the original position of pontoon 50, and pontoon 172 is secured to sump 174 opposite pontoon 52. In this multiple-unit configuration, the boom 16 is secured as described above to the rear of pontoon 172 and can be taken up by winching mechanism 84 and hydraulic pickup rollers 88 on pontoon 50, described above.

Conveyors 179 and 179', which are similar to conveyor 113, are carried between pontoons 50 and 170 and pontoons 52 and 172, respectively. The rear shafts of the conveyors 179 and 179' are mounted in suitable bearing housings, similarly to the rear shaft 116 of conveyor 113. To avoid the need for more than one variable-speed hydraulic motor, forward shaft 114 extends through bearing housing 120 and is connected to forward shaft 180 of conveyor 179 by coupling 182. Shaft 180 is carried by bearing housings 184 and 186 which are secured in any appropriate manner, such as by bolts, to the top of pontoons 170 and 50, respectively. The forward shaft 188 of conveyor 179' is attached to hydraulic motor 122 through suitable connectors (not shown) for rotation therewith, the shaft extending across the conveyor to a bearing housing 199 on the top of pontoon 172. This coupled shaft arrangement permits the three conveyors 113, 179 and 179' to be rotated together by the same hydraulic motor 122 to remove oil from the surface of the water and deposit it in the respective sumps.

In order to remove the oil from sumps 174 and 176, conduits 192 and 194, respectively, extend from the sumps to suction pump 154. If desired, water removal lines similar to line 158 in the single-unit configuration may be provided for sumps 174 and 176 and be connected to the suction pump 162. However, as shown in FIG. 11, separate suction pumps 196 and 196' can be provided with individual water removal lines 198 and 198', if desired. NOrmally, when a single scoop unit is used, any holes (not shown) in the ends of the sump 39 which might be provided to permit the outside sumps 174 and 176 to be secured thereto will be capped or blocked in any suitable manner to prevent oil from leaking back into the water.

One of the primary advantages of the present oil removal apparatus is that it is an air-transportable system; that is, the apparatus is made of lightweight material such as aluminum or fiberglass, and all members and units are normally bolted together or secured in some other manner which will permit the unit to be easily disassembled. All the hardware, such as the rollers 86, the cleaning unit 90, the bearing housings 118, hydraulic motor 122, etc., which are secured to the pontoons will normally be bolted down so they may be removed. If desired, the bulkheads 78 and 78' in the pontoons may be made removable and the pontoons tapered so that they may be telescoped together for easier, less bulky transportation.

Figure 12:
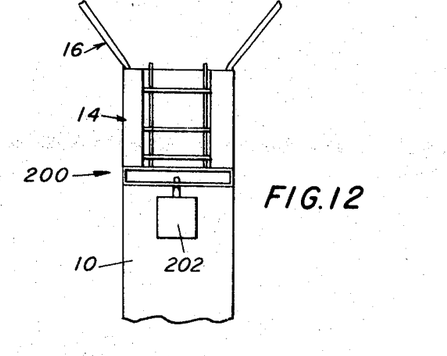
FIG. 12 is a general top plan view showing the oil-removing apparatus built into the aft portion of a motorized vessel.

FIG. 12 illustrates a unit which is made integrally with a motorized vessel 200. The boom 16 is secured to either side of the vessel, and a storage tank 202 is built into the vessel to receive the oil. This motorized vessel unit would be the ideal system to be used in a harbor where oil tankers are loaded and enormous oil slicks caused by spillage results.

It can be seen from the above description of the drawings that this invention provides an apparatus which will remove a floating layer of oil from the surface of the body of water and will separate the oil and water so that the oil may be used at a later date. This is accomplished by scooping the oil off the surface of the water and entrapping a portion of the removed oil to act as a check valve or filter means which permits water removal to insure that only oil is removed by the unit. The device is made of a lightweight material and can be easily dismantled so that it is ideal for transporting to locations where a major oil slick may occur. It may also be incorporated in a vessel for use around oil rigs, harbors and the like for continuous use in cleaning up the small spills which are a commonplace occurrence.

This preferred embodiment can be modified in various ways such as changing the material used, varying the methods of securing the members together and using different drive means for the forward shafts, winches, rollers, and the like. Further, it will be understood that the relative dimensions and positioning of the elements of the present device are for purposes of illustration, and that the size of the oil removal apparatus will vary considerably, as will the degree of incline of the conveyor, with the particular environment in which the apparatus is to be used. If the apparatus is used in the open sea, a one-way check valve could be provided for the outlet of the oil bed chamber to prevent wave action from forcing the oil and water in the oil bed chamber back into the calming chamber, and if the apparatus is limited to use in rivers and protected harbors, it will be apparent that smaller, less rugged equipment can be used than would be required in deep sea use. However, it will be apparent that these types of variations are within the scope of the present invention, and may be made without departing from the true spirit of the invention as defined by the following claims.

What is claimed is:

1. An apparatus for removing a layer of a first liquid from the surface of a second liquid having a density greater than said first liquid comprising:
    a. means for receiving said first and second liquids;
    b. sealing means cooperating with said receiving means to seal off successive portions of said first and second liquids from the rest of said first and second liquids;
    c. Means for trapping a bed of said first liquid, said means for trapping including a plurality of apertures in said receiving means and detention chamber means located beneath said receiving means which communicates with said receiving means through said apertures, said detention chamber means retaining said bed of said first liquid; and
    d. means for transporting said sealing means through said receiving means so that said successive portions of said first and second liquids are carried across said bed, whereby the second liquid in said successive portions will pass through said bed and return to the second liquid.

2. The apparatus of claim 1, further including means for maintaining said apparatus at a preselected level with respect to the surface of said second liquid so that said bed will be maintained between said receiving means and the surface of said second liquid.

3. The apparatus of claim 1, further including means for removing and storing the lesser density liquid so that it can be used later.

4. The apparatus of claim 1, wherein said first liquid is oil and said second liquid is water.

5. The apparatus of claim 1, further including means for confining said first liquid on the surface of said second liquid.

6. The apparatus of claim 5, further including means for drawing said confined first liquid towards said receiving means.

7. The apparatus of claim 5, further including means for drawing said first liquid toward said receiving means.

8. The apparatus of claim 1, wherein said receiving means includes a channel means having an inclined bottom member and two side members, said channel means having one end open for receiving said first and second liquids.

9. The apparatus of claim 8, wherein said detention chamber is formed by a downwardly extending forward bulkhead and the bottom and side members of said channel means, said chamber encompassing all the apertures in the bottom member.

10. The apparatus of claim 9, wherein said chamber further includes a lower inclined bulkhead secured to said forward bulkhead and sides of said channel means, said lower inclined bulkhead preventing wave action in the body of water from dispersing the trapped oil bed.

11. The apparatus of claim 1, wherein said sealing means includes paddle means which will contact said receiving means and seal off successive portions of said first and second liquids.

12. The apparatus of claim 11, wherein said channel means is integrally formed with the aft portion of a motorized vessel.

13. The apparatus of claim 11, wherein said channel sides are pontoons for floating said channel means in the second liquid.

14. The apparatus of claim 13, wherein said means for selectively positioning said channel means in said second liquid includes a ballasting mechanism for said pontoons.

15. The apparatus of claim 11, wherein said transporting means includes conveying means for carrying said sealing means so that said successive sealed off portions of said first and second liquids are carried through said receiving means and exposed to said apertures in said receiving means.

16. The apparatus of claim 15, wherein said paddle means includes a plurality of paddles carried on said conveying means, each of said paddles having a flexible rim which contacts said receiving means so that successive portions of said first and second liquids are sealed off from the rest of said first and second liquids.

17. The apparatus of claim 16, wherein said conveying means further includes drive means for moving said plurality of paddles through said channel, and means for selectively varying the speed of said drive means so that the period of time which said successive sealed-off portions of said first and second liquids are exposed to said apertures in said bottom member can be varied, thereby varying the amount of said second liquid which will pass through the apertures.

18. The apparatus of claim 17, further including means for selectively positioning said channel means in the second liquid so that the number of said apertures in said bottom member above the surface of the second liquid can be varied.

19. The apparatus of claim 18, wherein said drive means is a variable-speed hydraulic motor.

20. The apparatus of claim 18, further including means for confining the first liquid on the surface of the second liquid.

21. The apparatus of claim 20, further including means for drawing inside first liquid toward said channel means.

22. The apparatus of claim 21, wherein said means for confining said first liquid is a boom having an inflatable portion for buoyancy and a depending skirt which prevents the first liquid from escaping under said boom, the opposite ends of said boom being secured to opposite sides of said channel means so that said boom encircles the layer of said first liquid.

23. The apparatus of claim 22, wherein said means for drawing said first liquid toward said channel means includes:
    a. hydraulic pickup rollers secured to one side of said channel means; and
    b. a winching mechanism secured to said apparatus for taking up and storing said boom.

24. The apparatus of claim 21, further including means for removing from said apparatus and storing said layer of said first liquid.

25. The apparatus of claim 24, wherein said removing and storing means includes:
    a. a sump secured to the other end of said channel means for receiving said layer of first liquid separated from said successive portions of said first and second liquids by the trapping means, said layer of first liquid being carried to said sump by said paddle means;
    b. the storage tank associated with said apparatus for storing the removed first liquid; and
    c. means for pumping said first liquid from said sump to said storage tank.

26. The apparatus of claim 24, wherein said channel means is integrally formed with the aft portion of a motorized vessel.

27. A scoop unit for removing oil form the surface of a body of water comprising:
    a. a sump;
    b. first and second spaced parallel pontoons secured to said sump for providing buoyancy for said unit;
    c. an inclined bottom plate located between and secured to said pontoons and said sump, said pontoons and said bottom member forming a channel, said bottom plate having a plurality of holes near the lower edge of the plate;
    d. at least one paddle means cooperating with said channel to seal off a portion of oil and water from the body of water;
    e. conveyor means carried on said pontoons for carrying said paddle means through said channel so that said paddle pushes said portion of oil and water up said inclined bottom plate at a rate which permits said water and oil to separate into layers and said water to pass through the holes; and
    f. a chamber located below the bottom plate for trapping a bed of oil which will permit the water in the sealed-off portion of oil and water to pass through the holes while preventing the oil from passing therethrough.

28. The scoop unit of claim 27, further including ballasting means for selectively positioning said unit in the body of water so that the number of holes in said bottom plate above the surface of the water can be varied.

29. The scoop unit of claim 27, wherein said conveyor means includes:

a. first and second spaced parallel shafts rotatable mounted on said first and second pontoons and extending across the space between said pontoons, said shaft being secured to the rear ends of said pontoons and said second shaft being located at the forward end of the pontoons near the sump;
b. at least two sprockets mounted on each said shaft, and spaced from said pontoons, said sprockets on said first shaft being in alignment with said sprockets on said second shaft;
c. at least two chains encircling said aligned sprockets on said first and second shafts to form an endless chain; and
d. means for driving one of said shafts so that said paddle means carried by said conveyor means will enter the body of water at the rear end of the unit, said paddle means cooperating with said channel to seal off a portion of oil and water and push the sealed-off portion up the inclined bottom plate.

30. The scoop unit of claim 29, wherein said means for driving said conveyor is a variable speed hydraulic motor.

31. The scoop unit of claim 27, wherein said conveyor means includes:
a. first and second parallel shafts rotatably mounted on said first and second pontoons and extending across the space between said pontoons, said first shafts being secured to the rare ends of said pontoons and said second shaft being located at the forward end of the pontoons near the sump;
b. continuous belt means encircling said first and second shafts and carrying said paddle means; and
c. means for driving one of said shafts so that said paddle means carried on said belt means will enter the body of water at the rear of the unit said paddle means cooperating with said channel to seal off a portion of oil and water and push the sealed-off portion of oil and water up the inclined bottom plate.

32. The scoop unit of claim 27, further including boom means for confining the oil in a particular area.

33. The scoop unit of claim 32, further including a take up means for said boom means so that said oil on the surface of the water will be drawn toward said scoop unit.

34. The scoop unit of claim 33, wherein one end of said boom means is secured to one of said pontoons and the other end of said boom means is attached to said take up means, said boom encircling said oil slick.

35. The scoop unit of claim 34, wherein said scoop unit is towed by a barge.

36. The scoop unit of claim 35, wherein said take up means includes:
a. hydraulic pick up rollers secured to the rear of the other of said pontoons;
b. a cleaning unit carried on said other pontoon which will clean the unit and discharge the residue into the scoop unit; and
c. a winch mechanism located on said barge for storing the boom means.